(12) United States Patent
Hirano et al.

(10) Patent No.: US 8,251,035 B2
(45) Date of Patent: Aug. 28, 2012

(54) ENGINE CONTROL APPARATUS AND ENGINE CONTROL METHOD

(75) Inventors: Masahiro Hirano, Yokohama (JP); Yasushi Takeda, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 65 days.

(21) Appl. No.: 12/955,465

(22) Filed: Nov. 29, 2010

(65) Prior Publication Data
US 2011/0155085 A1 Jun. 30, 2011

(30) Foreign Application Priority Data
Dec. 25, 2009 (JP) ................ 2009-294046

(51) Int. Cl.
*F02N 11/10* (2006.01)
(52) U.S. Cl. ............. 123/179.4; 123/179.28; 701/112; 701/113
(58) Field of Classification Search .......... 701/112–113; 123/179.3, 179.4, 179.25, 179.28
See application file for complete search history.

(56) References Cited

U.S. PATENT DOCUMENTS
2004/0221828 A1 11/2004 Ries-Mueller et al.
2007/0084429 A1* 4/2007 Taki et al. ................ 123/179.4

FOREIGN PATENT DOCUMENTS
FR 2920205 2/2009
GB 2363266 12/2001
JP 2005-330813 A 2/2005
WO WO-2005/045239 5/2005

OTHER PUBLICATIONS
The extended European Search Report of corresponding European Patent Application No. 10192620.2-1263, dated Mar. 30, 2011.

* cited by examiner

*Primary Examiner* — Hai Huynh
(74) *Attorney, Agent, or Firm* — Global IP Counselors, LLP

(57) ABSTRACT

An engine control apparatus is provided that controls an engine which is restarted using an AC motor. The engine control apparatus comprises an engine rotational direction determining section, a restart command determining section and an engine restart prohibiting section. The engine rotational direction determining section is configured to determine a rotational direction of the engine. The restart command determining section is configured to determine if a restart command occurred while a rotational speed of the engine is decreasing due to an idle stop command. The engine restart prohibiting section is configured to selectively prohibit the engine from being restarted by the AC motor in response to the restart command upon determining the engine is rotating backward.

4 Claims, 4 Drawing Sheets

ENGINE CONTROL APPARATUS AND ENGINE CONTROL METHOD

CROSS-REFERENCE TO RELATED APPLICATIONS

This application claims priority to Japanese Patent Application No. 2009-294046, filed on Dec. 25, 2009. The entire disclosure of Japanese Patent Application No. 2009-294046 is hereby incorporated herein by reference.

BACKGROUND

1. Field of the Invention

The present invention generally relates to an engine control apparatus and an engine control method. More specifically, the present invention relates to starting an engine using an AC motor.

2. Background Information

A conventional engine automatic stop/restart apparatus (e.g., see Japanese Laid-Open Patent Publication No. 2005-330813) is known in which, when an engine restart command occurs while an engine rotational speed is decreasing after an idle stop command has occurred, a rotational speed of pinion gear of a starter motor is synchronized with a rotational speed of a ring gear of a flywheel and the pinion gear is meshed with the ring gear. Cranking of the engine then starts without waiting for the rotation of the engine to stop.

SUMMARY

It has been discovered that in an arrangement in which the engine is started with a motor-generator, the engine may be started while the engine is undergoing rotational backlash (rotating backward) due to an engine restart command occurring while the engine rotational speed is decreasing. In such a case, the duration of a large electric current occurring in a MOS (metal oxide semiconductor) transistor of the motor-generator is determined in accordance with the rotational speed of the engine at that time. The slower the rotational speed of the engine, the longer the duration of the electric current. Thus, if a large current occurs in the MOS transistor while the rotational speed of the engine is in a low rotational speed region for a long time, particularly if the current occurs when the engine is undergoing rotational backlash (rotating backward), a semiconductor portion of the MOS transistor will heat up and there is a possibility that the service life (durability) of the MOS transistor will decline. The engine control apparatus disclosed herein protects the MOS transistor by subjecting it to a less stringent environment, thereby lengthening the life of the MOS transistor.

The engine control apparatus and the engine start control method of this disclosure were conceived in view of this problem with the conventional technology. One object presented in this disclosure is to provide an engine control apparatus and/or an engine start control method that improves a service life of a motor-generator by limiting restarting of an engine with the motor-generator while the engine is in a low rotational speed region.

In view of the state of the known technology, an engine control apparatus is provided that controls an engine which is started using an AC motor. The engine control apparatus comprises an engine rotational direction determining section, a restart command determining section and an engine restart prohibiting section. The engine rotational direction determining section is configured to determine a rotational direction of the engine. The restart command determining section is configured to determine if a restart command occurred while a rotational speed of the engine is decreasing due to an idle stop command. The engine restart prohibiting section is configured to selectively prohibit the engine from being restarted by the AC motor in response to the restart command upon determining the engine is rotating backward.

Also, an engine control method is provided that an engine which is restarted using an AC motor. The engine control method comprises determining if a restart command occurred while a rotational speed of the engine is decreasing due to an idle stop command, determining a rotational direction of the engine, and selectively prohibiting the engine from being restarted by the AC motor in response to the restart command upon determining the engine is rotating backward.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
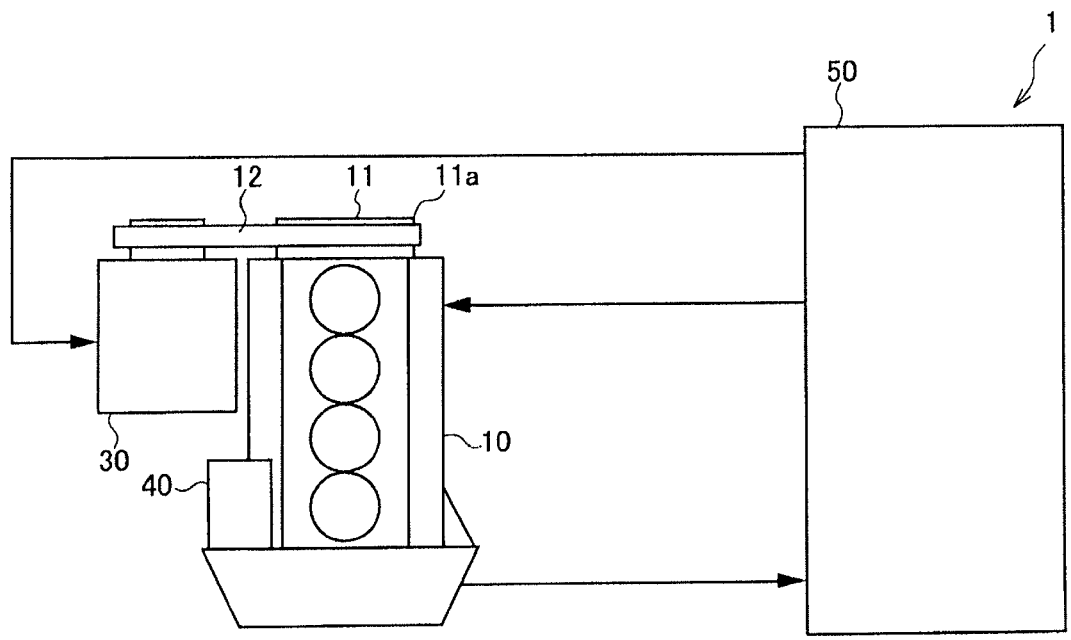
FIG. 1 is a schematic system diagram of an engine control apparatus according to one illustrated embodiment.
Figure 2:
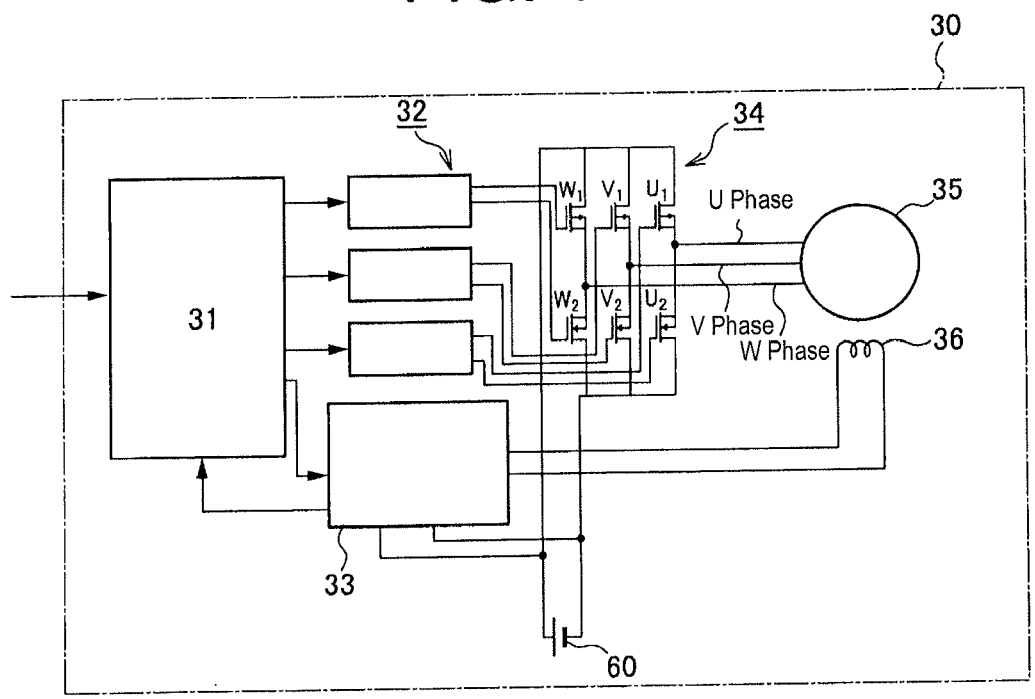
FIG. 2 is a schematic view of an electrical system of an SSG of the engine control apparatus illustrated in FIG. 1.

Referring initially to FIG. 1, an engine control apparatus 1 is schematically illustrated for restarting an engine 10 in accordance with one illustrated embodiment. The engine 10 is an inline four-cylinder engine. However, any kind of cylinder arrangement is acceptable for the engine 10. The engine 10 has a crankshaft 11 with a crank pulley 11a attached to one end of the crankshaft 11. The engine 10 is also provided with a side-mounted starter generator (SSG) 30. FIG. 2 is a schematic view of an electrical system of the SSG 30 of the engine control apparatus 1 illustrated in FIG. 1. A belt 12 is arranged around the crank pulley 11a and the SSG 30.

A crank angle sensor 20 detects a rotational speed and a rotation direction of the engine. The crank angle sensor 20 is discussed in more detail below.

The SSG 30 is synchronized with the crankshaft 11 of the engine 10 by means of the belt 12. The SSG 30 functions as a starter for cranking the crankshaft 11 when restarting the engine 10. The SSG 30 also functions as an alternator for generating electricity using drive power from the crankshaft 11 while the engine 10 is running. The SSG 30 functions as a restarter and/or an alternator in response to SSG control signals transmitted from a controller 50. The SSG 30 is driven to restart the engine 10 when an engine restart command is issued after an idle stop has occurred. In the illustrated embodiment, the SSG 30 is a three-phase synchronous AC motor. More details of the SSG 30 are provided later.

The starter motor 40 is driven when the engine 10 is started by a user turning a key, pushing an ignition button or any other starting operation.

The controller 50 preferably includes a microcomputer having a central processing unit (CPU), a read only memory (ROM), a random access memory (RAM), and an input-output interface (I/O interface). It is also acceptable for the controller 50 to comprise a plurality of microcomputers. The controller 50 controls the operation of the SSG 30 and a fuel injection timing and a fuel injection quantity of the engine 10 based on signals from the crank angle sensor 20 and other sensors. Thus, the controller 50 includes, among other things, a fuel injection control program that controls the fuel injection system of the engine. It will be apparent to those skilled in the art from this disclosure that the precise structure and algorithms for the controller 50 can be any combination of hardware and software that will carry out the functions of the present invention.

Basically, the controller 50 is configured to prohibit starting of the engine 10 with the SSG 30 (e.g., an AC motor) while the engine 10 is rotating backward. Since starting of the engine 10 with the SSG 30 (e.g., an AC motor) is prohibited while the engine 10 is rotating backward, a large electric current can be prevented from occurring for a long period of time in a semiconductor switch of the SSG 30 (e.g., an AC motor) that serves to convert a DC electric power source into an alternating current. As a result, the semiconductor portion of the SSG 30 (e.g., an AC motor) can be protected and the service life of the AC motor can be extended.

The electrical system of the SSG 30 will now be explained with reference to FIG. 2. The SSG 30 includes, among other things, an integrated circuit 31, a gate driving circuit 32, an excitation circuit 33, a MOS transistor 34, a rotor 35 and a stator 36. The SSG 30 is excited and driven using an external battery 60 as an electric power source.

The control integrated circuit 31 controls a voltage applied to the gate driving circuit 32 and the excitation circuit 33 in accordance with an SSG control signal from the controller 50. The control integrated circuit 31 takes into account the effects of a rotational speed of the rotor 35 and heat generated by electric current.

The gate driving circuit 32 turns the MOS transistor 34 on and/or off. The gate driving circuit 32 controls the direction and magnitude of a current delivered to the rotor 35 using the MOS transistor 34 in order to convert a direct current supplied from the battery 60 into an alternating current.

The excitation circuit 33 controls a current fed to the stator 36 and serves to excite the stator 36. "Excitation" as used herein refers to supplying an electric current to the stator 36 to generate a magnetic force.

The MOS transistor 34 includes three pairs of semiconductor switches (U1, U2, V1, V2, W1, W2) as shown in FIG. 2. When the switch U1 on one side of the MOS transistor 34 is turned ON, the switch U2 on the other side is turned OFF. The switches U1 and U2 are each connected a U-phase line that connects to the rotor 35. When the switch U1 is ON, an electric current flows from the battery 60 toward the rotor 35. Conversely to the switch U1, when the switch U2 turns ON, a current flows from the rotor 35 toward the battery 60. The same holds for the pair of switches V1 and V2 and the pair of switches W1 and W2. The switches U1, V1, and W1 are turned ON 120 degrees out of phase with one another. By turning the switches ON and OFF, the outputs (U phase, V phase, and W phase) of the rotor 35 are alternating currents that repeatedly alternate between a positive waveform and a negative waveform. In this way, the MOS transistor 34 converts direct-current power from the battery 60 in to alternating current.

The rotor 35 is an electromagnet. An armature coil comprising a U phase winding, a V phase winding and a W phase winding is arranged on the rotor 35. The three-phase alternating current resulting from the conversion of direct current from the battery 60 by the MOS transistor 34 is fed to the three windings of the rotor 35. Thus, the phases of the electric currents in the wires differ by 120 degrees. A magnetic field generated at the rotor 35 changes from moment to moment in accordance with the changing magnitude and direction of the electric currents.

The stator 36 is a field magnet that generates a magnetic field when it is excited. A field coil is arranged on the stator 36. A direct current from the battery 60 flows to the field coil of the stator 36 and excites the stator 36.

In order for the SSG 30 to be driven, the stator 36 must first be excited. Once excitation of the stator 36 is completed, a three-phase alternating current is supplied to the rotor 35. Attractive forces and repelling forces occurring between the electromagnet of the rotor 35 and the field magnet of the stator 36 cause the rotor to undergo a continuous rotational motion. The rotation of the rotor 35 is transmitted to the crankshaft 11 of the engine 10 through the belt 12. Thus, the SSG 30 converts electrical energy into mechanical energy and cranks (starts) the engine 10.

When a restart command occurs while the engine rotational speed is decreasing due to an idle stop command, there is a possibility that the engine 10 will be started while it is rotating backward if starting of the engine 10 is commenced by driving the SSG without waiting until the engine 10 has completely stopped. If the engine 10 is started while rotating backward, there is a possibility that a current will exist in a semiconductor of the SSG 30 or a long period of time, causing the semiconductor of the SSG 30 to heat up and the service life of the SSG 30 to decline. By prohibiting a SSG-driven engine starting condition while the engine is rotating backward, a decline in the service life of the SSG 30 can be prevent with respect to a conventional arrangement. The starting the engine with the SSG 30 in response to various commands by the controller 50 will be described in more detail later.

Figure 3:
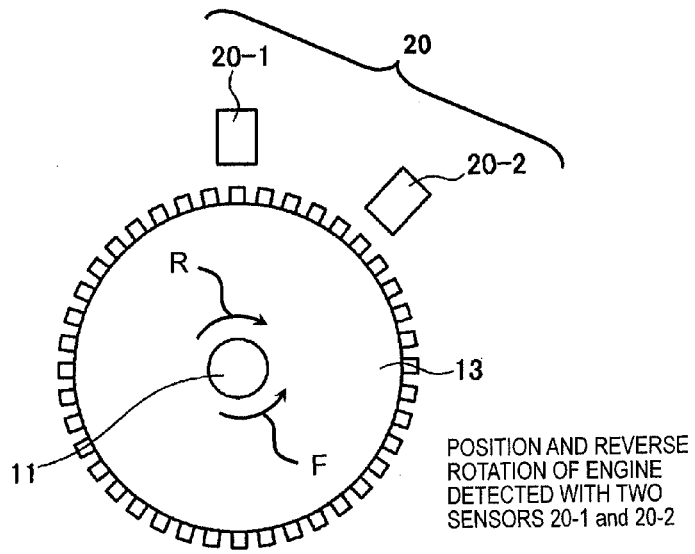
FIG. 3 is a schematic diagram of the crank angle sensor for the engine control apparatus illustrated in FIG. 1 as viewed from an axial direction of the crankshaft.
Figure 4:
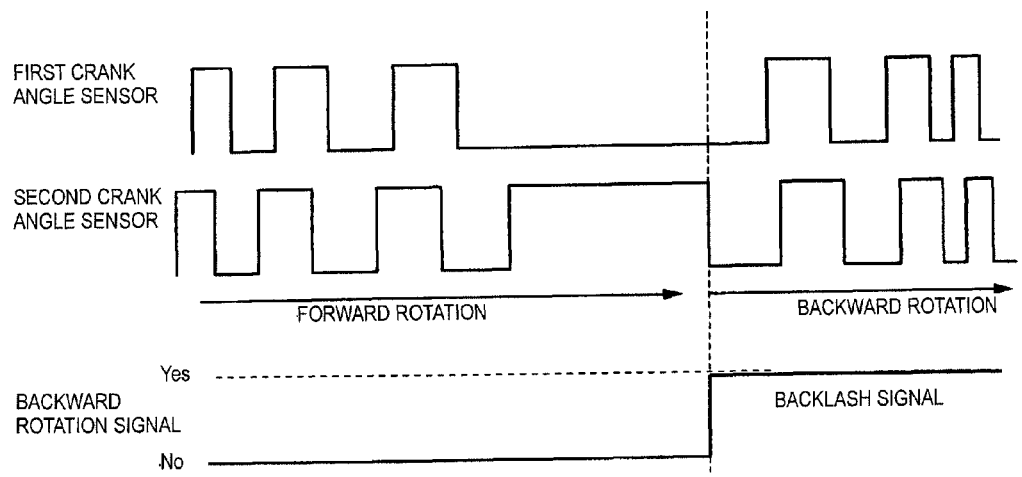
FIG. 4 is a plot for explaining a method of detecting a rotation direction using the crank angle sensor illustrated in FIG. 3.

Referring now to FIGS. 3 and 4, the crank angle sensing arrangement of the engine control apparatus 1 will be discussed. FIG. 3 shows the crank angle sensor 20 as viewed from an axial direction of the crankshaft. FIG. 4 is a plot for explaining a method of detecting a rotation direction using the crank angle sensor 20. A ring gear 13 is fixed around an entire circumference of the crankshaft 11. The ring gear 13 has recesses and protrusions (teeth) arranged at equal intervals. In this illustrated embodiment, the crank angle sensor 20 includes a first crankshaft angle sensor 20-1 and a second crankshaft angle sensor 20-2. The first and second crankshaft angle sensors 20-1 and 20-2 are arranged relative to the crankshaft 11 to detect the recesses and protrusions of the rink gear 13.

The first and second crankshaft angle sensors 20-1 and 20-2 detect the recesses and protrusions of the ring gear 13 at prescribed phases (prescribed rotational positions). When the engine 10 rotates in a forward direction F, the second crankshaft angle sensor 20-2 issues a detection signal earlier than a detection signal issued by the first crankshaft angle sensor 20-1, as shown on the left side of FIG. 4. When the engine rotates backward R, the first crankshaft angle sensor 20-1 issues a detection signal earlier than a detection signal issued by the second crankshaft angle sensor 20-2, as shown on the right side of FIG. 4. By using two crankshaft angle sensors (e.g., the first and second crankshaft angle sensors 20-1 and 20-2), the rotational direction of the crankshaft 11 can be recognized based on the order of the detection signals from the sensors 20-1 and 20-2.

An engine start control logic of the controller 50 will now be explained referring to the flowchart of FIG. 5. In the engine control apparatus 1, a field system of the SSG 30 is achieved using either an electromagnet or a permanent magnet. This embodiment explains a case in which the field system of the SSG 30 uses an electromagnet and, thus needs to be excited. The engine control apparatus 1 executes the engine start control logic of the flowchart illustrated in FIG. 5 repeatedly once per small cycle time (e.g., 10 msec).

In step S1, the controller 50 determines if the SSG 30 is in an excitation mode. The excitation mode is a mode in which the stator 36 is excited before the SSG 30 is driven as a starter for the engine 10. If the SSG 30 is not in the excitation mode, then the controller 50 proceeds to step S2. If the SSG 30 is in the excitation mode, then the controller 50 proceeds to step S6.

In step S2, the controller 50 determines if an idle stop condition is satisfied. The idle stop condition is, for example, a condition in which the engine 10 has maintained an idling rotational speed for a prescribed amount of time. If the idle stop condition is satisfied, the controller 50 proceeds to step S3. If the idle stop condition is not satisfied, then the controller 50 exits the control sequence.

In step S3, the controller 50 executes a fuel cut. A fuel injector receives a fuel injection stop signal from the controller 50 and stops a supply of fuel to the engine 10.

In step S4, the controller 50 determines if an engine restart command has occurred. An engine restart command constitutes, for example, releasing a brake pedal from a depressed state. If an engine restart command has occurred, the controller 50 proceeds to step S5. If an engine restart command has not occurred, the controller 50 exits the control sequence.

In step S5, the controller 50 sets the SSG 30 to the excitation mode.

In step S6, the controller 50 determines if excitation of the SSG 30 has been completed. Excitation is deemed completed when a sufficient magnetic flux exists in the stator 36 to drive the SSG 30 as a starter for starting the engine 10. Completion of excitation is determined based on whether an amount of time required for excitation has elapsed and detection of an excitation current value. If the excitation has been completed, then the controller 50 proceeds to step S7. If the excitation has not been completed, then the controller 50 exits the control sequence.

In step S7, the controller 50 determines if the engine 10 is rotating backward. Backward rotation R is determined by identifying the rotational direction using the crank angle sensor 20 as described previously. If the engine 10 is rotating backward, then the controller 50 exits the control sequence. If the engine 10 is not rotating backward, i.e., is rotating forward, then the controller 50 proceeds to step S8.

In step S8, the controller 50 restarts the engine 10 by driving the SSG 30. The SSG 30 changes from excitation mode to starter mode.

The actual operation of the engine control apparatus 1 will now be explained with reference to FIG. 6 (solid line curves). Since this control is based on the assumption that the engine 10 is idling, the explanation will start from a point when the engine 10 is running at an idling rotational speed.

Figure 5:
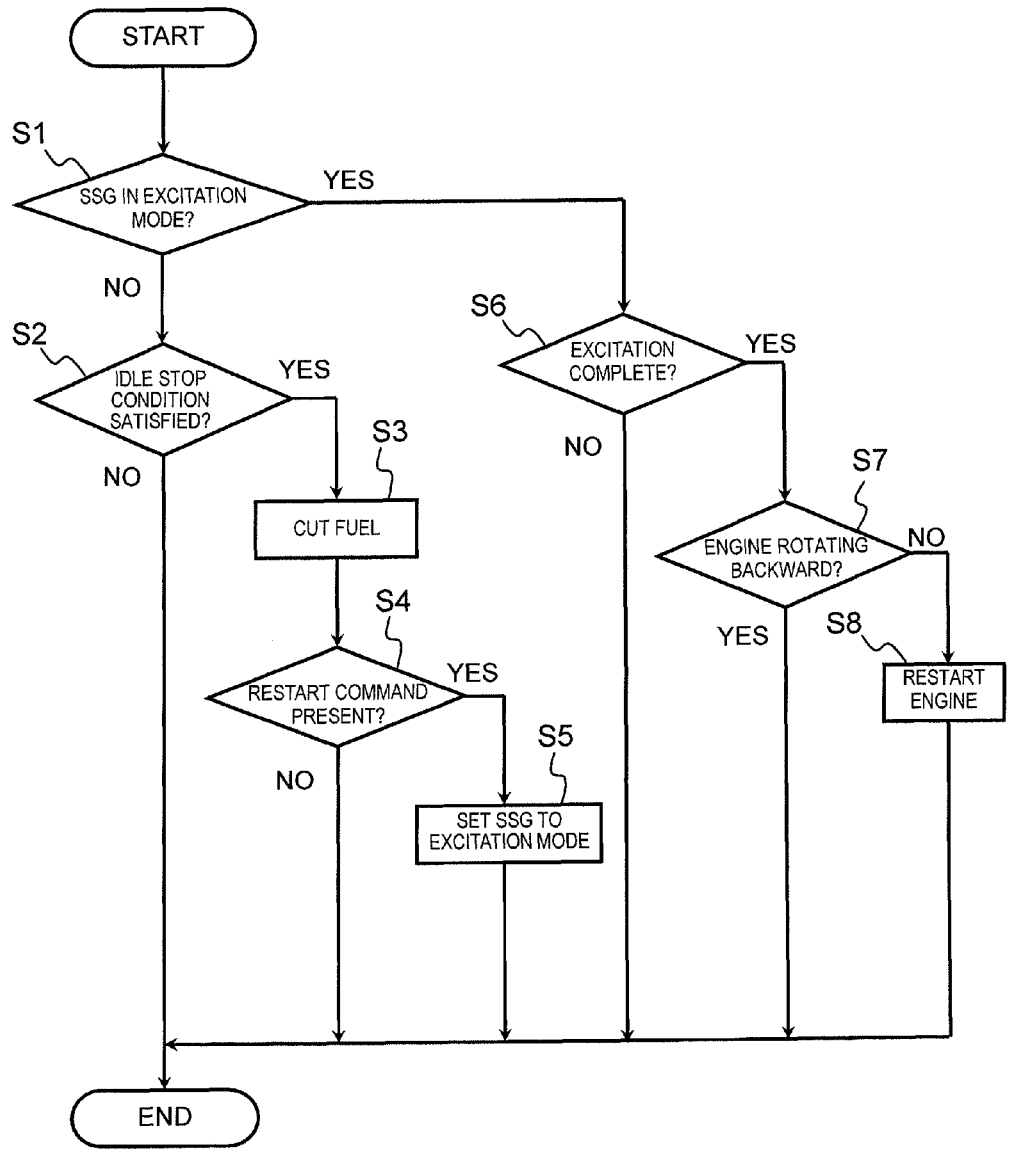
FIG. 5 is a flowchart explaining operation of the engine control apparatus illustrated in FIG. 1.

At a time t1, the engine 10 has maintained an idling rotational speed for a prescribed period of time and the idle stop condition is satisfied (FIG. 5—No in step S1 and Yes in step S2). Since idling will be stopped, a fuel supply to the engine 10 is stopped (FIG. 5—step S3). At the same time, the SSG 30 is changed from an alternator mode to a neutral mode (plot (C) of FIG. 6). The neutral mode is a waiting mode in which the SSG 30 functions as neither an alternator (i.e., generating AC electricity) nor a starter. The rotational speed of the engine 10 starts decreasing from the time t1 (plot (A) of FIG. 6).

Figure 6:
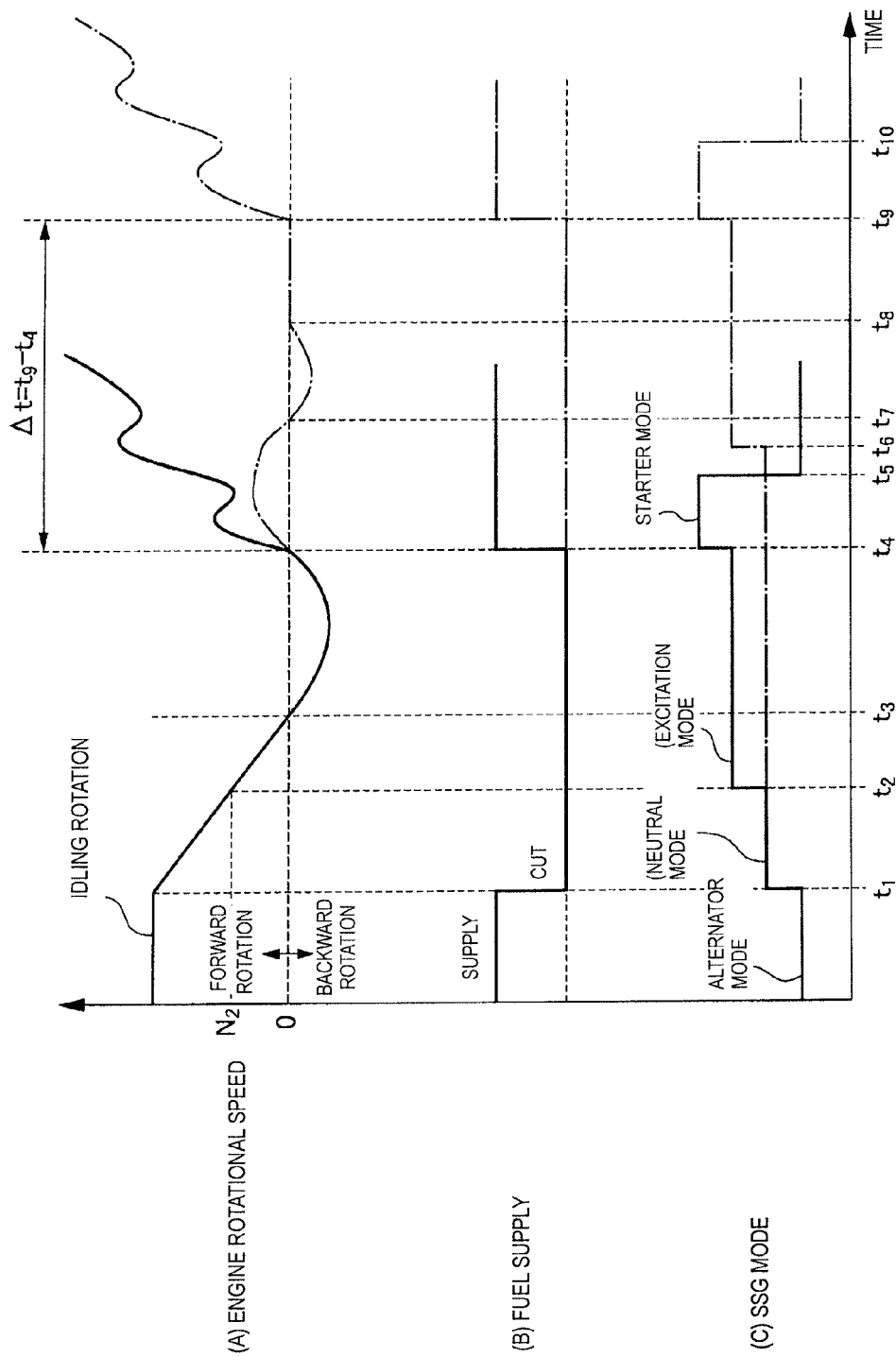
FIG. 6 is a chart explaining operation of the engine control apparatus illustrated in FIG. 1.

At a time t2, a request to restart the engine 10 occurs and the SSG 30 is set to the excitation mode (plot (C) of FIG. 6, Yes in step S4→step S5). Excitation of the SSG 30 commences.

At a time t3, the rotation of the engine 10 changes from forward rotation to backward rotation (plot (A) of FIG. 6). While the engine 10 is rotating backward, the SSG 30 is not set to starter mode even if the excitation of the SSG 30 is completed (Yes in step S6→Yes in step S7).

At a time t4, the rotation of the engine 10 changes from backward rotation to forward rotation (plot (A) of FIG. 6, No in step S7). Also, the excitation of the SSG 30 is completed (plot (C) of FIG. 6, Yes in step S1→Yes in step S6). If the engine 10 is rotating forward when the excitation of the SSG 30 is completed, then the SSG 30 is set to starter mode and fuel starts being supplied (plots (B) and (C) of FIG. 6, step S8). The engine 10 is cranked and the engine rotational speed increases (plot (A) of FIG. 6).

At a time t5, the engine 10 has started and the SSG 30 is changed from the starter mode to the alternator mode (plot (C) of FIG. 6).

This embodiment depicts a situation in which an engine restart command occurs at a time t2 and the engine 10 changes from backward rotation to forward rotation simultaneously with completion of excitation of the SSG 30 at a time t4. Thus, the amount of time obtained by subtracting t2 from t4 is the amount of time necessary to excite the SSG 30. However, if the engine restart command occurs at a time prior to the time t2 while the rotational speed of the engine 10 is decreasing, then there is a possibility that starting of the engine 10 will be prohibited because of backward rotation and the duration of the excitation mode will be extended even though excitation of the SSG 30 has been completed. Also, even if excitation is completed at or before the time t3 while the rotation of the engine 10 is determined to be forward, it is still possible that the engine 10 will be started while rotating backward due to a variation (delay) in communication of the control signal.

In consideration of these possibilities, it is acceptable to commence excitation of the SSG 30 when the rotational speed of the engine 10 is equal to or below a threshold value, i.e., equal to or below a rotational speed N2 occurring at the time t2. In this way, the excitation of the SSG 30 and the starting of the engine 10 can be executed efficiently. The threshold value N2 is calculated according to the specifications of the engine.

With this embodiment, when a restart command occurs while the rotational speed of the engine 10 is decreasing due to an idle stop command, if the engine 10 is rotating backward, then starting of the engine 10 is prohibited even if excitation of the SSG 30 has been completed. In this way, a large electric current can be prevented from continuing for a long period of time in the MOS transistor 34 of the SSG 30. Thus, the semiconductor portions of the MOS transistor 34 can be protected and the service life of the SSG 30 can be prevented from declining.

When the excitation of the SSG 30 is complete and the engine 10 is rotating forward, starting of the engine 10 is commenced using the SSG 30. Since the SSG 30 is driven when the rotational velocity of the engine 10 is positive, the engine 10 can escape from a low rotational speed region more readily. Consequently, a large electric current can be prevented from continuing for a long period of time in the MOS transistor 34 of the SSG 30. As a result, the service life of the SSG 30 can be prevented from declining.

Although the field system of the SSG 30 is an electromagnet in the embodiment described above, the same effects can be obtained as described previously when a permanent magnet not requiring excitation is used. Thus, starting of the engine 10 using the SSG 30 is prohibited if the engine 10 is rotating backward when a condition for driving the SSG 30 is satisfied. Meanwhile, starting of the engine 10 is commenced using the SSG 30 if the rotation of the engine 10 is forward. As a result, the service life of the SSG 30 can be prevented from declining.

When the SSG 30 requires excitation as in the embodiment, the apparatus excites the SSG 30 while the engine 10 is rotating backward. While the engine 10 is rotating backward, setting the SSG 30 to the starter mode is prohibited and the SSG 30 is set to the excitation mode instead of the neutral mode. Thus, if the excitation is completed while the engine 10 is rotating backward as described in the embodiment, then the SSG 30 can be driven immediately after the rotation of the engine 10 changes from backward to forward. Even though driving the SSG 30 is prohibited while the engine 10 is rotating backward, the starting performance of the engine 10 can be improved by permitting excitation of the SSG 30.

It is also acceptable to commence excitation of the SSG 30 when the rotational speed of the engine 10 becomes equal to or below a prescribed rotational speed N2. In such a case, even if a restart command occurs at an early stage after the rotational speed of the engine 10 starts decreasing due to an idle stop command, the excitation of the SSG 30 will not commence until the engine 10 reaches the prescribed rotational speed N2. Consequently, a situation in which the excitation of the SSG 30 is completed while the engine 10 is rotating backward and the excited state (amount of time during which a current flows to the SSG 30) becomes extended is avoided. As a result, the excitation time of the SSG 30 does not become longer than necessary. Additionally, this approach eliminates the possibility of an unusual situation in which a restart condition is satisfied while the engine 10 is still rotating forward prior to rotating backward (Yes in S6 and No in S7) but the effect of a delayed control signal causes the engine 10 to be started while rotating backward. Since starting of the engine 10 while it is rotating backward can be prohibited, the service life of the SSG 30 can be prevented from declining. The prescribed rotational speed N2 is set such that if excitation of the SSG 30 is commenced when that rotational speed is reached, then the excitation will be completed simultaneously with the transition of the engine 10 from backward rotation to forward rotation. As a result, starting of the engine 10 can be commenced when the SSG 30 has been excited for an appropriate amount of time. Additionally, the starting performance of the engine 10 is improved because the engine 10 can be started by the SSG 30 immediately after the engine 10 changes from backward rotation to forward rotation.

Another embodiment is indicated with a single-dot chain line in FIG. 6. In this other embodiment, an idle stop condition is satisfied at the time t1 and the engine transitions from an idling state to idle stop state. Even if an engine restart command occurs at the time t2 while the rotational speed of the engine 10 is decreasing, the engine 10 will not be started by the SSG 30 until a time t9 at which the engine 10 has completely stopped. Excitation of the SSG 30 is commenced at a time t6 obtained by subtracting a time required for excitation to be completed from the time t9. The amount of time required for the engine 10 to stop completely after the idle stop condition is satisfied and the amount of time required for excitation are determined based on the engine specifications. The engine 10 is defined to be completely stopped when the rotational speed of the engine 10 has remained at zero for a prescribed amount of time (amount of time between the times t8 and t9). The completely stopped state is defined in this way in order to ignore times when the rotational speed of the engine 10 becomes zero momentarily as the engine 10 transitions between forward rotation and backward rotation due to backlash. Thus, with this other embodiment, it takes time (the amount of time from the time t2 to the time t9) to proceed from the engine restart command to starting the engine.

Consequently, assuming an engine restart command occurs at the same time t2, the embodiment indicated with a solid-line curve in FIG. 6 can start the engine with the SSG 30 earlier than the embodiment indicated with a single-dot chain line curve in FIG. 6 by an amount of time Δt equal to the time t9 minus the time t4.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

Furthermore, the engine control apparatus is not limited to the embodiments described heretofore. In other words, while only selected embodiments have been chosen to illustrate the present invention, it will be apparent to those skilled in the art from this disclosure that various changes and modifications can be made herein without departing from the scope of the invention as defined in the appended claims.

For example, although in the embodiments a belt is arranged between the SSG and the crankshaft of the engine, the engine control apparatus is not limited to such a configuration. For example, it is acceptable to use a gear mechanism instead of a belt. Although in the embodiments both an SSG and a starter motor are both provided and the SSG is used to restart the engine when a restart command occurs after an idle stop, it is acceptable to use an SSG for starting the engine from a cold state in with the vehicle and the engine are stopped with a key or button ignition operation in addition to restarting the engine after an idle stop. Thus, the terms "restart" and "restarting" as used herein have different meanings from the terms "start" and "starting." In particular, the terms "restart" and "restarting" do not include starting the engine from a cold state in with the vehicle and the engine are stopped with a key or button ignition operation. However, the terms "start" and "starting" as used herein are generic terms that includes restarting the engine. Thus, the engine control apparatus disclosed herein can also include an engine starting section in addition to the engine restarting section discussed above.

Also, for example, although in the embodiments the SSG is a three-phase AC synchronous motor, the engine control apparatus is not limited to such an SSG. The SSG is also not limited to a rotating armature arrangement in which the rotor serves as the armature and the stator serves as the field system. The engine control apparatus can be applied to other arrangements so long as the SSG is an AC motor provided with a semiconductor component, such as a MOS transistor. Additionally, the method of determining the rotational direction of the engine is not limited to a method using a crank angle sensor having two crankshaft angle sensors 20-1 and 20-2. For example, it is acceptable to provide a separate engine rotational direction detecting device to determine the rotational direction of the engine.

Moreover, it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An engine control apparatus that controls an engine which is restarted using an AC motor, the engine control apparatus comprising:
    an engine rotational direction determining section configured to determine a rotational direction of the engine;
    a restart command determining section configured to determine if a restart command occurred while a rotational speed of the engine is decreasing due to an idle stop command;
    an engine restart prohibiting section configured to selectively prohibit the engine from being restarted by the AC motor in response to the restart command upon determining the engine is rotating backward; and
    an excitation section configured to commence to excite a field magnet of the AC motor when the rotational speed of the engine is equal to or below a prescribed rotational speed, the prescribed rotational speed being set such that if the excitation is commenced when the prescribed rotational speed is reached, then the excitation is completed simultaneously with the transition of the engine from backward rotation to forward rotation.

2. The engine control apparatus according to claim 1, further comprising
    an engine restarting section configured to selectively restart the engine by driving the engine with the AC motor in response to the restart command upon determining the engine is rotating forward.

3. An engine control method that controls an engine which is restarted using an AC motor, the engine restart control method comprising:
    determining if a restart command occurred while a rotational speed of the engine is decreasing due to an idle stop command;
    determining a rotational direction of the engine;
    selectively prohibiting the engine from being restarted by the AC motor in response to the restart command upon determining the engine is rotating backward; and
    selectively exciting a field magnet of the AC motor when the rotational speed of the engine is equal to or below a prescribed rotational speed, the prescribed rotational speed being set such that if the excitation is commenced when the prescribed rotational speed is reached, then the excitation is completed simultaneously with the transition of the engine from backward rotation to forward rotation.

4. The engine control method according to claim 3, further comprising
    selectively restarting the engine by driving the engine with the AC motor in response to the restart command upon determining the engine is rotating forward.

* * * * *